United States Patent
Zahradsky et al.

(10) Patent No.: US 10,651,707 B2
(45) Date of Patent: May 12, 2020

(54) ROTARY ELECTRIC MACHINE HAVING A TURBINE HAVING INCREASED NEGATIVE PRESSURE

(71) Applicant: MOTEURS LEROY-SOMER, Angoulême (FR)

(72) Inventors: Vit Zahradsky, Hanusovice (FR); Alexis Dutau, Angoulême (FR)

(73) Assignee: MOTEURS LEROY-SOMER, Angoulême (FR)

( * ) Notice: Subject to any disclaimer, the term of this patent is extended or adjusted under 35 U.S.C. 154(b) by 89 days.

(21) Appl. No.: 15/739,433

(22) PCT Filed: Jul. 1, 2016

(86) PCT No.: PCT/EP2016/065537
§ 371 (c)(1),
(2) Date: Dec. 22, 2017

(87) PCT Pub. No.: WO2017/001671
PCT Pub. Date: Jan. 5, 2017

(65) Prior Publication Data
US 2018/0175703 A1    Jun. 21, 2018

(30) Foreign Application Priority Data

Jul. 2, 2015 (FR) ..................... 15 56256

(51) Int. Cl.
*H02K 9/06* (2006.01)
*H02K 1/32* (2006.01)
(Continued)

(52) U.S. Cl.
CPC ............... *H02K 9/06* (2013.01); *H02K 1/32* (2013.01); *F04D 29/28* (2013.01); *F04D 29/32* (2013.01);
(Continued)

(58) Field of Classification Search
CPC ........ F04D 29/28; F04D 29/32; F04D 29/325; H02K 1/32; H02K 3/24; H02K 9/04; H02K 9/06; H02K 9/08
(Continued)

(56) References Cited

U.S. PATENT DOCUMENTS

| 6,234,767 | B1  | 5/2001 | Takeda et al. |
| 8,487,490 | B2 * | 7/2013 | Dutau ............ H02K 9/14 |
| | | | 310/63 |

(Continued)

FOREIGN PATENT DOCUMENTS

| DE | 560135 C | 9/1932 |
| DE | 10256805 A1 | 6/2004 |

(Continued)

OTHER PUBLICATIONS

Muller et al., English Machine Translation of DE 10256805 (Year: 2004).*

(Continued)

*Primary Examiner* — Jermele M Hollington
*Assistant Examiner* — Rashad H Johnson
(74) *Attorney, Agent, or Firm* — Cooper Legal Group, LLC; Ronald M. Kachmarik

(57) ABSTRACT

A rotary electric machine that includes a rotor and a stator and is cooled by a stream of air generated by at least one fan. The fan is driven by a main shaft of the machine or by its own drive system. The fan includes main blades (33) for generating a stream of cooling air and, upstream of said main blades, tins which at least partially cover coil heads of the stator in the axial direction.

12 Claims, 3 Drawing Sheets

Figure 1:
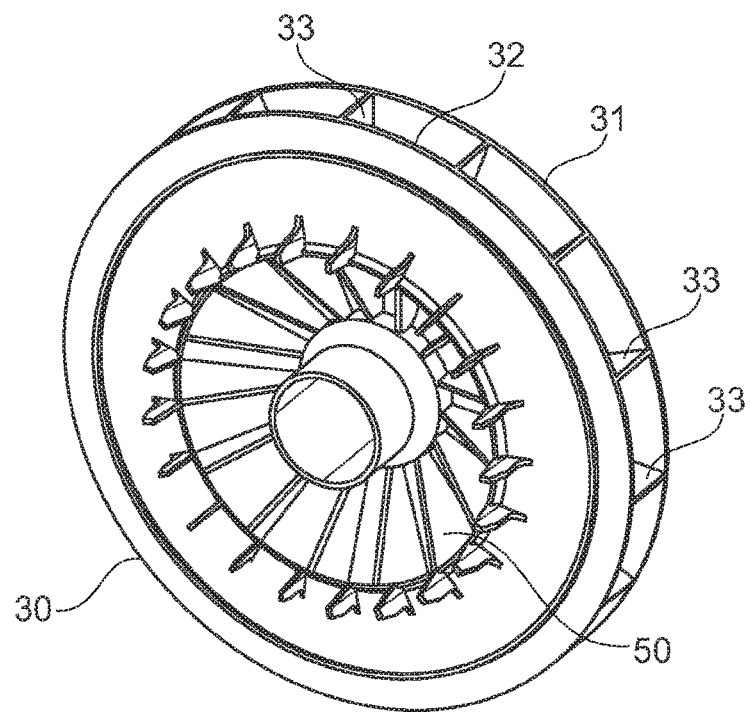

(51) Int. Cl.
*H02K 9/04* (2006.01)
*H02K 9/08* (2006.01)
*F04D 29/28* (2006.01)
*F04D 29/32* (2006.01)
*H02K 3/24* (2006.01)

(52) U.S. Cl.
CPC .............. *F04D 29/325* (2013.01); *H02K 3/24* (2013.01); *H02K 9/04* (2013.01); *H02K 9/08* (2013.01)

(58) Field of Classification Search
USPC ................ 310/52, 54, 55, 58, 62, 63, 64, 89
See application file for complete search history.

(56) References Cited

U.S. PATENT DOCUMENTS

2006/0261687 A1* 11/2006 Nagayama ............... H02K 5/20
                                                              310/58
2010/0133933 A1* 6/2010 Ikaheimo .............. F04D 25/082
                                                              310/62
2011/0037330 A1* 2/2011 Dutau ...................... H02K 9/06
                                                              310/62
2012/0141261 A1* 6/2012 Giovannetti .......... F04D 29/624
                                                              415/203
2017/0005545 A1* 1/2017 Kaneko .................... H02K 5/16

FOREIGN PATENT DOCUMENTS

FR          1319228 A        2/1963
JP          58150373 U       9/1983
JP          2003219605 A     7/2003
WO          2008006934 A1    7/2007

OTHER PUBLICATIONS

Corresponding International application, application No. PCT/EP2016/065537 International Search Report dated Sep. 9, 2016, 3 pages.

* cited by examiner

ROTARY ELECTRIC MACHINE HAVING A TURBINE HAVING INCREASED NEGATIVE PRESSURE

The present invention relates to a rotary electric machine.

The invention relates more particularly, but not exclusively, to the cooling of open rotary electric machines, whether these are single-phase or polyphase.

An "open rotary electric machine" is a machine cooled by a flow of air taken from outside the machine.

The invention relates more particularly to the cooling of machines whose rotor comprises windings with coil heads and winding portions parallel to the axis of rotation of the machine, which are also called "straight portions", which are held by clamping wedges.

Various improvements for increasing the effectiveness of the cooling of such machines, in particular as described in application FR2940867, have already been proposed.

Patent FR1319228 discloses a fan for an electric machine. The air is drawn in through openings arranged on one of the flanges and is directed through the machine. The fan comprises strengthening ribs arranged on the outer face of the mobile wheel in order to promote the return air current.

Utility model JPS58150373 discloses a machine comprising a two-part rotor and two fans respectively attached to these two parts. The downstream fan comprises two sets of blades.

Application JP2003219605 discloses a closed machine having a fan that comprises two pairs of blades.

Patent DE560135 describes a machine having openings on the end faces of the casing, via which the air is admitted. The machine comprises two fans respectively located close to these openings which direct the stream of air toward outlet openings located on the lateral surface of the casing. Each one of the fans comprises main blades and secondary blades attached to the main blades by means of the supports.

Application DE10256805 discloses a two-shroud fan having protuberances on the shroud upstream of the direction of the air current.

The invention aims to further improve rotary electric machines and achieves this with a rotary electric machine that comprises a rotor and a stator and is cooled by a stream of air generated by at least one fan, which may be driven by a main shaft of the machine or by its own drive system, this fan comprising main blades for generating a stream of cooling air and, upstream of these main blades, fins which at least partially cover coil heads of the stator in the axial direction.

The "coil heads" of the stator are to be understood as those parts of the windings of the stator which extend out from the slots of the magnetic circuit of the stator, in particular those parts of the windings which go from one slot to another.

The invention makes it possible to further increase the effectiveness of the cooling of the rotor and of the stator of the machine.

The invention makes it possible to use the rotation of the rotor to cool the stator, the cooling fins generating a stream of air that is directed in the radial direction toward the windings of the stator.

The fins preferably adjoin an air inlet of a main part of the fan which comprises the main blades and through which the air through the machine is drawn.

Preferably, the fins are arranged, in the radial direction of the machine, between the end of the coil heads of the stator and the coil heads of the rotor.

The fins may axially cover the coil heads of the stator, over a distance of between 0 and 80% of the height of the coil heads of the stator.

Preferably, the fins axially cover the coil heads of the stator over a distance of between 5 and 500 mm, in particular more than 90% of the total height of a fin.

The fins may axially cover coil heads of the rotor, for example over a distance of between 0 and 80% of the height of the coil heads of the rotor. This covering of the coil heads of the rotor may further improve the effectiveness of the fan.

The fan may be of different type, for example centrifugal or helico-centrifugal.

The fan may comprise at least one shroud. The fan for example has two shrouds. In the latter case, the air inlet may comprise a rear opening located on the upstream shroud, via which the air is drawn before being ejected radially outward by the main blades. Said opening is preferably central.

Preferably, this opening is the only air inlet of the fan.

The two shrouds may be connected to one another by main blades. The latter may be oriented so as to generate a stream of air that is ejected radially outward.

The fins may be located on the upstream shroud, preferably close to said rear opening, for example the fins adjoin the edge of the opening.

The number of fins is preferably greater than the number of blades. The number of fins may also be smaller than the number of blades.

The fins may be connected perpendicularly to the shroud or to one of the shrouds of the fan.

The fins preferably have a radial dimension that decreases with increasing distance from the rest of the fan.

Preferably, the fins are elongate in the axial direction of the machine. "Elongate" is to be understood as meaning that the fins have a dimension in the axial direction of the machine which is greater than the maximum dimension of the fins in the radial direction.

The fins are preferably molded in one piece with the rest of the fan. As a variant, a ring bearing the fins may be attached to the rest of the fan.

The machine according to the invention is preferably an open rotary electric machine, for example an alternator.

Figure 2:
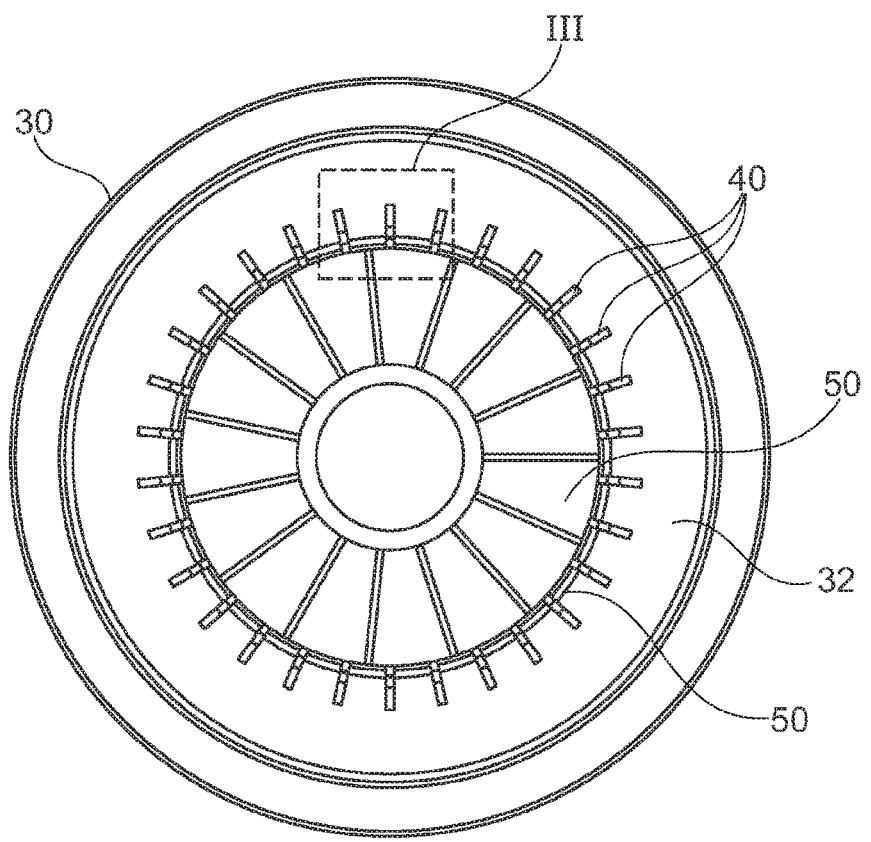
Figure 3:
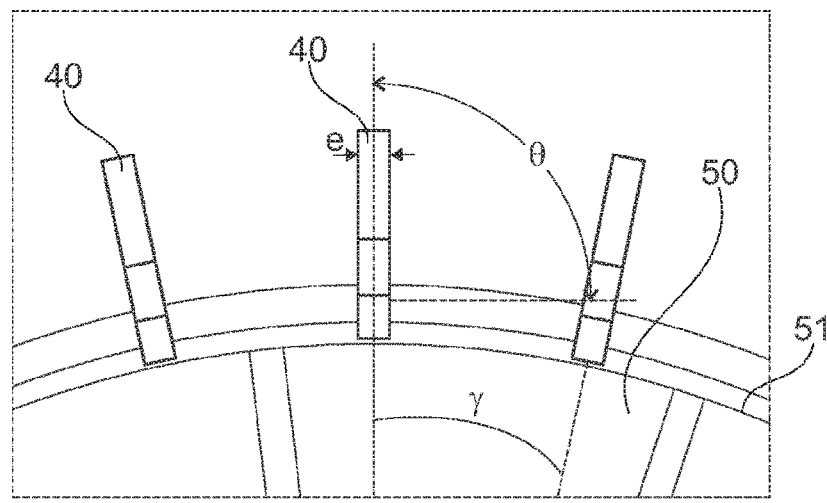
Figure 4:
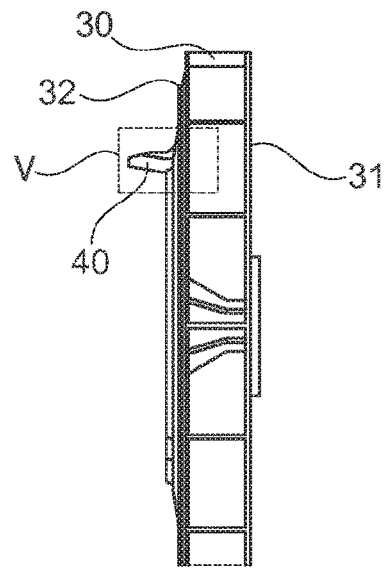
Figure 5:
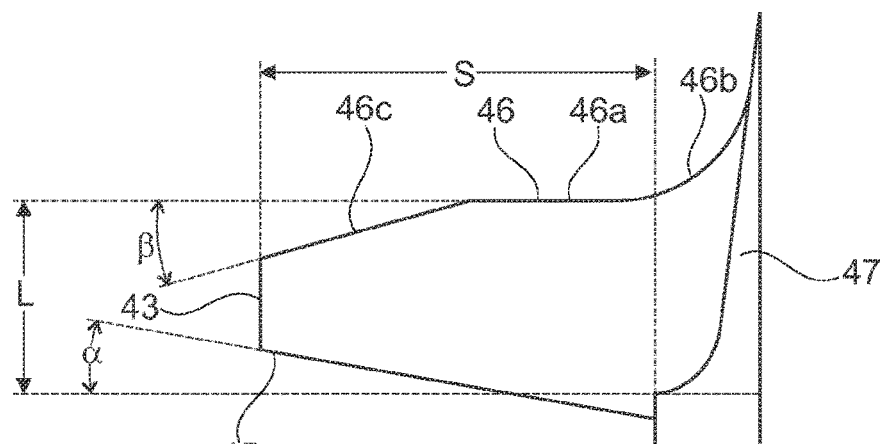
Figure 6:
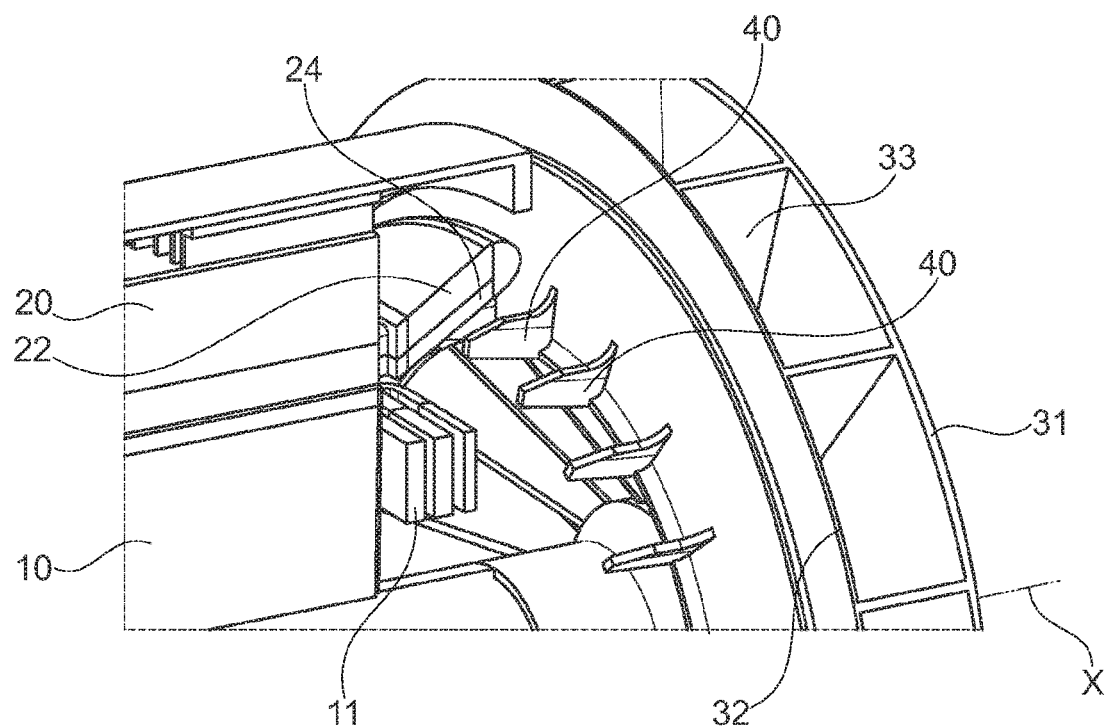
Figure 7:
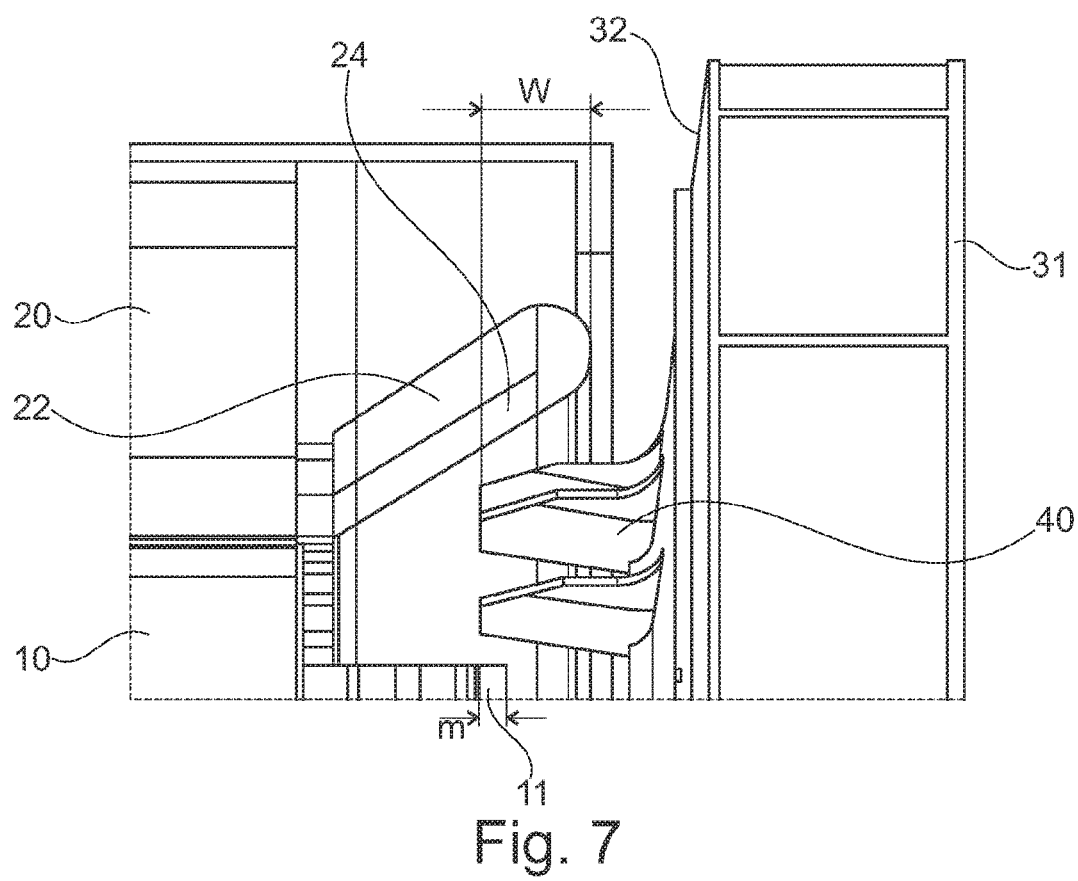

The invention will be able to be better understood upon reading the following detailed description of non-limiting exemplary implementations thereof, and upon examining the appended drawing, in which:

FIG. 1 shows, schematically and in perspective, a fan produced according to the invention, FIG. 2 shows the fan of FIG. 1, as seen along the axis of rotation, FIG. 3 shows a detail of FIG. 2, FIG. 4 is a partial view, from the side, of the fan of FIG. 1, FIG. 5 shows a detail of embodiment, FIG. 6 shows part of a rotary electric machine equipped with the fan of FIG. 1, and FIG. 7 shows an enlarged portion of the rotary electric machine of FIG. 1.

The invention applies to all rotary electric machines and more particularly, but not exclusively, to alternators.

An alternator generally comprises a main part and an exciter. Thus, the rotor may comprise a main inductor and an exciter armature, while the stator comprises a main armature and an exciter inductor.

The rotor, and in particular the main inductor, may comprise one or more stacks of sheets defining poles onto which are coiled conductors. The latter may comprise straight portions that extend along the axis of rotation and are held on the one or more stacks of sheets by clamping screws and wedges.

Only one part of the rotor is shown in FIG. 6. This figure shows the stack of sheets 10 of a pole of the rotor and the corresponding coil head 11.

The stator 20 also comprises a stack of sheets that defines a magnetic circuit, with slots receiving windings 22. The stator may have distributed coil winding or coils wound on teeth.

The invention is most particularly suited to stators having distributed coil winding, in which the conductors are introduced in bulk into the slots, this type of coil winding also being referred to as "random winding". The invention also covers machines having coil winding on the stator referred to as "form wound".

The shaft of the rotor rotates a fan 30, also referred to as a "turbine", which is present on one side of the main inductor.

The electric machine may comprise only one fan 30 or, as a variant, two fans, at each end of the main inductor, for example.

FIGS. 1 and 4, in particular, show that the fan 30 may have two shrouds, the two shrouds 31 and 32 being connected to one another by main blades 33 that are oriented so as to generate a stream of air ejected in the radial direction.

In accordance with the invention, the fan 30 comprises, on the side of the shroud 32 facing the main inductor of the rotor, cooling fins 40 which are for example made in one piece with the rest of the fan 30, or as a variant with a support part that is attached to the rest of the fan 30. These fins 40 are for example, as shown in particular in FIG. 3, oriented radially.

FIG. 5 shows that their radial dimension L may vary between their base 47, by which they are attached to the shroud 32, and their end 43. For example, each fin 40 has a radial dimension L that decreases in the direction of the edge 43, with a radially inner edge 45 which makes an angle α with the axis of rotation X and a radially outer edge 46 which has a portion 46a, parallel to the axis of rotation, which attaches on the side of the shroud 32 by a concave edge 46b. The portion 46a extends toward the edge 43 via a straight edge 46c, making an angle β with the axis of rotation. For example, but not necessarily, β>α. The total height S by which the fins 40 project backward, away from the shroud 32, is for example between 0 and 80% of the distance between the shroud 32 and the stack of sheets of the stator 20, more preferably between 0 and 90% of the distance between the shroud 32 and the stack of sheets of the stator 20.

The radial dimension L of the fins 40 is for example between 0 and 50% of the inlet diameter of the fan. The angle β is for example between 0 and 180° and the angle α is between 0 and 180°.

The fan 30 is for example made of a thermoplastic material or of metal, or even by assembly of a part made of thermoplastic material onto a metallic part. The fins 40 may be made with the part made of thermoplastic material.

The fins 40 are located, as shown in particular in FIG. 1, close to the rear opening 50 of the shroud 32 through which the air is drawn before being ejected radially outward by the main blades 33.

In particular, the fins 40 either, as shown in particular in FIG. 2, adjoin the edge of the opening 50, or, in a variant which is not shown, are removed by a distance of between the inlet diameter of the fan and 90% of the outer diameter of the fan.

The opening 50 is preferably circular.

The radial inclination θ of the fins 40 with respect to the tangent to the edge 51 of the opening 50, which is 90° in FIG. 3, may vary.

The total number of fins 40 is for example between 1 and 100.

Preferably, the number of fins 40 is greater than the number of blades 33. For example, as shown in FIG. 2, the number of fins 40 is twice as great as the number of blades 33.

In accordance with the invention, the fins 40 axially cover the stator and more particularly, as shown in FIG. 7, cover the coil heads 24 thereof. The axial covering distance W is for example between 5 and 500 mm, wherein this distance may correspond for example to more than 90% of the total height S of a fin 40. The fins are arranged, in the radial direction, between the end of the coil heads of the stator and the coil heads of the rotor, as shown in FIG. 7.

FIG. 6 shows that the fins 40 engage in the space radially inside the coil heads 24 of the stator.

For example, there is axial covering between the fins 40 and the coil heads 11 of the rotor over a distance in that is, in the example in question, smaller than the distance W. For example, m is between 0 and 80% of the distance between the stack of sheets of the rotor 10 and the end of the coil heads. The tapered shape of the fins 40 when seen from the side, as shown in FIG. 5, makes it possible for them to engage: between the coil heads of the rotor and of the stator while limiting the risk of mechanical interaction therewith during rotation of the rotor.

The angular spacing γ between two consecutive fins 40, about the axis of rotation, may be between 0.1 and 180°, as shown in FIG. 3.

The thickness e of a blade is for example between 0.1 mm and 100 mm.

During operation of the machine, the fins 40 act somewhat like a radial fan placed in series with the main part of the fan formed by the blades 33 which extend between the shrouds 31 and 32. The presence of the fins 40 makes it possible to increase the total stream of air. The air which is ejected by the fins 40 is directed onto the coil heads 24 of the stator, and the latter act as a sort of deflector which returns the air to the rotor.

Negative pressure prevails at the inlet of the radial fan formed by the fins 40, thanks to which the main part of the fan 30 can operate with smaller losses and increased efficiency.

The air which is returned to the rotor has a higher velocity in the region of the ends of the coil heads 24 of the rotor, which makes it possible to increase the heat transfer coefficient and obtain more effective cooling, with a reduction in the risk of hotspots in the rotor coils.

The invention is not limited to the described example.

In particular, it is possible to further modify the shape and the type of fan, that of the rotor or that of the stator or of the structure of the machine; the invention also applies for example to a double-ventilation machine having a radial fan and a central air inlet, as described in patent EP 2274816.

The invention claimed is:

1. An open rotary electric machine that comprises a rotor and a stator and is cooled by a stream of air generated by at least one fan, in which the at least one fan is driven by a main shaft of the machine or the at least one fan comprises a drive system and is driven by the drive system, and the at least one fan comprises main blades for generating a stream of cooling air and comprises, upstream of the main blades, fins which at least partially and axially cover coil heads of the stator in the axial direction, the fins adjoining an air inlet of a main part of the fan which comprises the main blades, the fins generating a stream of air that is directed in the radial direction toward the windings of the stator, the fins having a radial dimension that decreases with increasing distance from the rest of the fan.

2. The machine as claimed in claim 1, the fins axially covering the coil heads of the stator over a distance of between 5 and 500 mm, the fins being arranged, in the radial direction of the machine, between the end of the coil heads of the stator and the coil heads of the rotor.

3. The machine as claimed in claim 2, the fins axially covering the coil heads of the stator over a distance of more than 90% of the total height of a fin.

4. The machine as claimed in claim 1, the fins axially covering coil heads of the rotor.

5. The machine as claimed in claim 4, the fins axially covering coil heads of the rotor over a distance of between 0 and 80% of the height of the coil heads of the rotor.

6. The machine as claimed in claim 1, the fan comprising at least one shroud.

7. The machine as claimed in claim 6, the fins being connected perpendicularly to the shroud or to one of the shrouds of the fan.

8. The machine as claimed in claim 1, the number of fins being greater than the number of main blades.

9. The machine as claimed in claim 1, the fins having a radial dimension that decreases with increasing distance from the rest of the fan.

10. The machine as claimed in claim 1, the fins being molded in one piece with the rest of the fan.

11. The machine as claimed in claim 1, being an alternator.

12. The machine as claimed in claim 1, the fins having an elongate shape in the axial direction of the machine.

* * * * *